US007665424B2

(12) United States Patent  
Denault et al.

(10) Patent No.: US 7,665,424 B2  
(45) Date of Patent: Feb. 23, 2010

(54) HARNESS INTERFACE CONDUIT, TETHER LINE, AND SWIVEL FOR USE IN ANIMALS

(75) Inventors: Steven Denault, Libertyville, IL (US); Matthew Ruiter, Grayslake, IL (US)

(73) Assignee: Strategic Applications, Inc., Libertyville, IL (US)

( * ) Notice: Subject to any disclaimer, the term of this patent is extended or adjusted under 35 U.S.C. 154(b) by 0 days.

(21) Appl. No.: 11/176,510

(22) Filed: Jul. 6, 2005

(65) Prior Publication Data

US 2007/0006820 A1 Jan. 11, 2007

(51) Int. Cl.
*A01K 27/00* (2006.01)
*A61M 5/32* (2006.01)

(52) U.S. Cl. .................... 119/792; 119/858; 604/174
(58) Field of Classification Search .......... 119/792, 119/793, 795, 814, 856, 712, 769, 421, 858; 604/174–179
See application file for complete search history.

(56) References Cited

U.S. PATENT DOCUMENTS

| | | | | |
|---|---|---|---|---|
| 3,543,724 A | * | 12/1970 | Kirkpatrick et al. | 119/702 |
| 3,897,751 A | * | 8/1975 | Gullino et al. | 119/420 |
| 3,957,082 A | * | 5/1976 | Fuson et al. | 137/625.41 |
| 4,699,613 A | * | 10/1987 | Donawick et al. | 604/80 |
| 4,756,707 A | * | 7/1988 | MacLeod et al. | 604/261 |
| 4,900,313 A | | 2/1990 | MacLeod et al. | |
| 5,305,712 A | * | 4/1994 | Goldstein | 119/784 |
| 5,566,645 A | * | 10/1996 | Cole | 119/712 |
| 5,762,636 A | * | 6/1998 | Rupp et al. | 604/264 |
| 5,816,256 A | * | 10/1998 | Kissinger et al. | 128/897 |
| 5,839,393 A | * | 11/1998 | Rupp et al. | 119/712 |
| 6,062,224 A | * | 5/2000 | Kissinger et al. | 128/897 |
| 6,086,564 A | * | 7/2000 | McLaughlin | 604/179 |
| 6,213,973 B1 | * | 4/2001 | Eliasen et al. | 604/93.01 |
| 6,279,511 B1 | * | 8/2001 | Loughnane | 119/769 |
| 6,459,917 B1 | * | 10/2002 | Gowda et al. | 600/345 |
| 6,503,225 B1 | * | 1/2003 | Kirsch et al. | 604/126 |
| 6,579,267 B2 | * | 6/2003 | Lynch et al. | 604/174 |
| 6,595,979 B1 | * | 7/2003 | Epstein et al. | 604/506 |
| 6,602,220 B1 | * | 8/2003 | Ludvig et al. | 604/30 |
| 6,666,853 B2 | * | 12/2003 | Chu et al. | 604/533 |
| 6,886,493 B1 | * | 5/2005 | Deneintolis et al. | 119/174 |
| 7,096,059 B2 | * | 8/2006 | Geddes et al. | 600/509 |
| 2002/0123724 A1 | * | 9/2002 | Douglas et al. | 604/177 |
| 2004/0006280 A1 | * | 1/2004 | Geddes et al. | 600/509 |

(Continued)

OTHER PUBLICATIONS

Covance Infusion Harness Instructions, models CIH62 and CIH 95 and 105 Sep. 2003, Instech Laboratories, Inc, 3 pages, from the Internet Archive http://web.archive.org/web/20030922101811/http://www.instechlabs.com/Support/manuals/.*

(Continued)

*Primary Examiner*—Trinh T Nguyen
*Assistant Examiner*—Joseph W Sanderson
(74) *Attorney, Agent, or Firm*—Biotech Beach Law Group, PC; Raymond Wagenknecht

(57) ABSTRACT

A harness for use in coupling with an animal interface, the animal interface comprising one or more of conduits for transmitting fluid, electrical signals, or optical signals. Swivel extension tether for quick connect to harness, dual-ended swivel, an extension line, and connection to upstream monitoring equipment. Method for using the harness in an animal for fluid communication access, an electrical signal interface, and an optical interface.

18 Claims, 7 Drawing Sheets

U.S. PATENT DOCUMENTS

Figure 1:
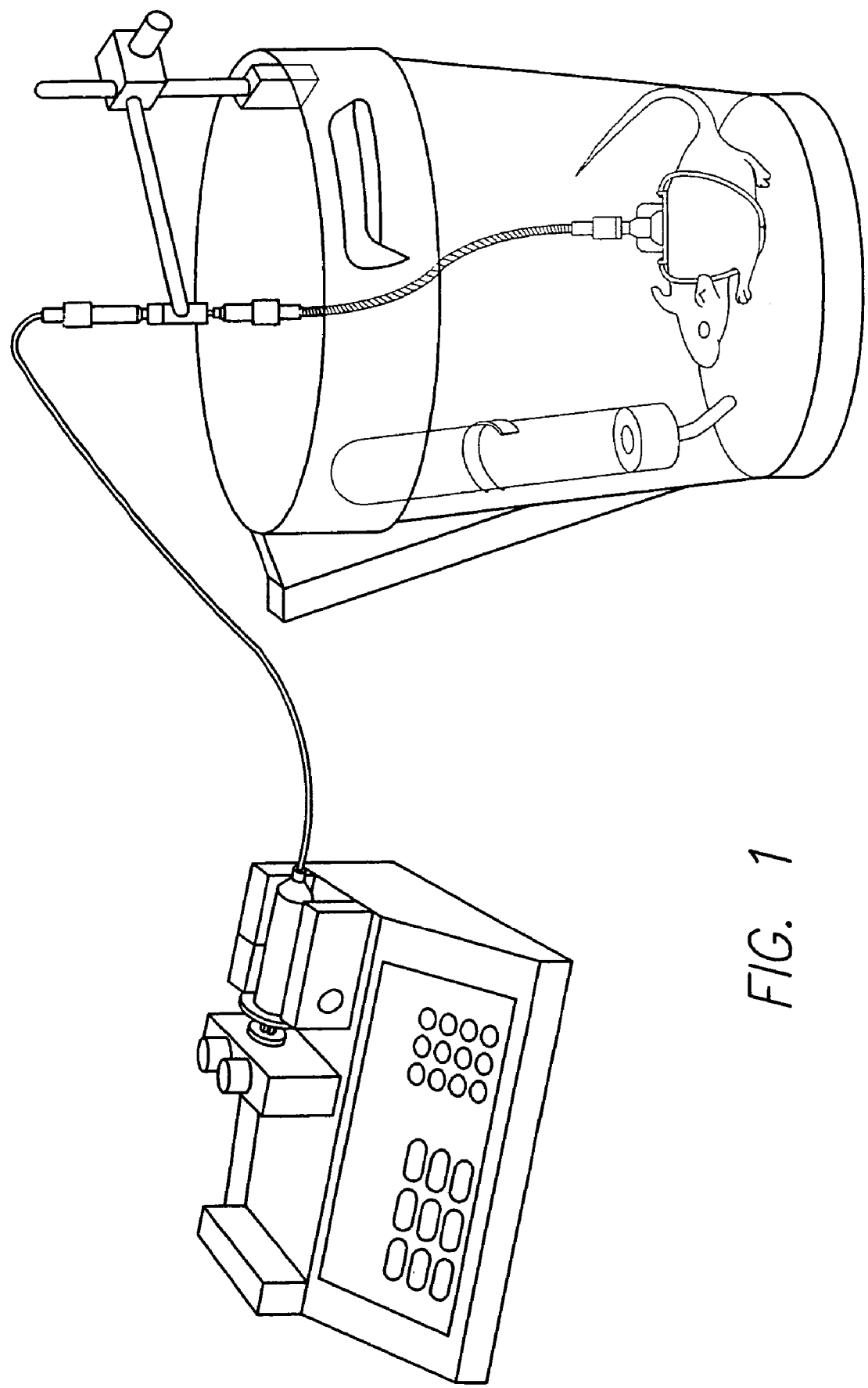
Figure 2A:
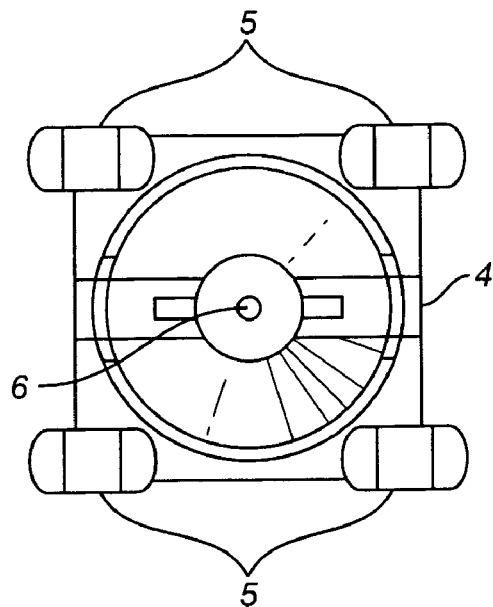
Figure 2B:
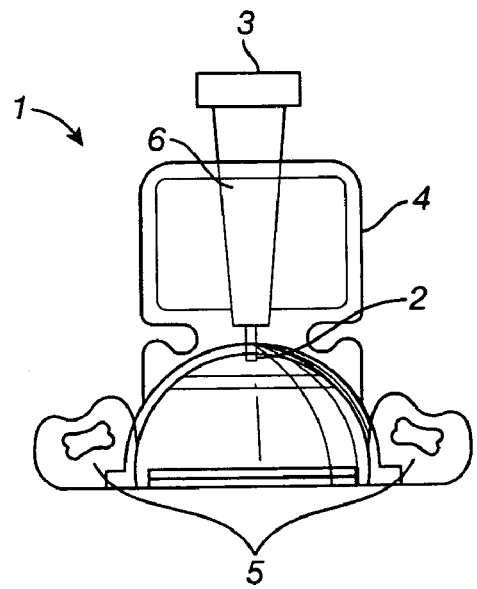
Figure 2C:
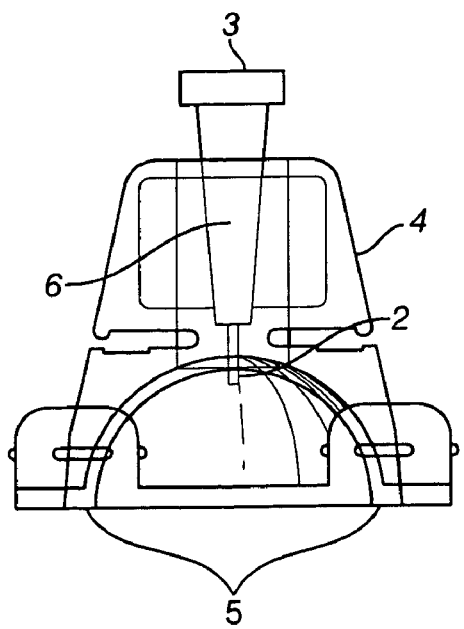
Figure 2D:
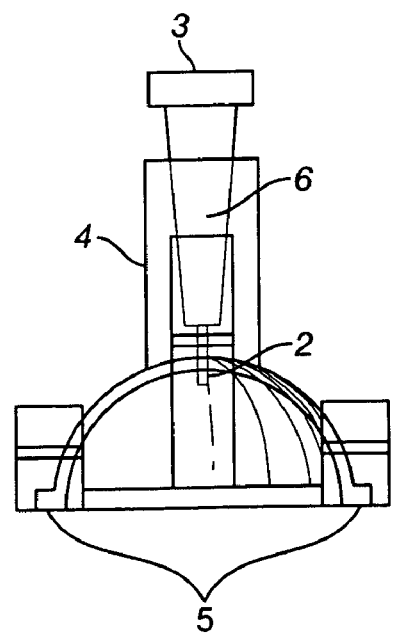

| | | | |
|---|---|---|---|
| 2005/0027258 A1* | 2/2005 | Bierman et al. | 604/174 |
| 2005/0090805 A1* | 4/2005 | Shaw et al. | 604/523 |
| 2006/0084922 A1* | 4/2006 | Botha | 604/174 |
| 2008/0058729 A1* | 3/2008 | Loughnane et al. | 604/175 |

OTHER PUBLICATIONS

Covance Infusion Harness for Rat and Mice Instech Laboratories, Inc., Sep. 23, 2003 via internet archive http://web.archive.org/web/20030923015010/http://www.instechlabs.com/Infusion/tethers/cih.php.*

"Integral." Dictionary.com Unabridged (v 1.1). Random House, Inc. Mar. 5, 2009. <Dictionary.com http://dictionary.reference.com/browse/integral>.*

The American Heritage Dictionary, $2^{nd}$ College Edition, 1976, p. 307.

Chatham, A.K., "Jacket and Swivel Tethering Systems", Lab Animal, 1985, vol. 14, No. 8, pp. 29-33.

Cunliffe-Beamer, T.L., "Applying Principles of Aseptic Surgery to Rodents", AWIC Newslett, 1993, vol. 4, pp. 3-6.

Fox, C.E., et al., "Chromic Veneous Catheterization: A Technique for Implanting and Maintaining Venous Catheters in Rats", J. Surg. Res., 1975, vol. 18, pp. 607-610.

Goode, R.L.G., et al., "Miniaturization: an Overview of Biotechnologies for Monitoring the Physiology and Pathophysiology or Rodent Animal Models", ILAR J., 2002, vol. 43, pp. 136-146.

Guillery, E.N., et al., "A Technique for Continuous Infusion in the Mouse Bladder", J. Urol., 1984, vol. 131, pp. 1005-1007.

Hagmuller, K., et al., "A Tail-artery Cannulation Method for the Study of Blood Parameters in Freely Moving Rats", J. PHarmacol. Toxicol. Methods, 1992, vol. 28, pp. 79-83.

Hartley, C.J., et al., "Noninvasive Cardiovascular Phenotyping in Mice", ILAR J., 2002, vol. 43, pp. 147-158.

Hedlund, L.W., et al., "Mechanical Ventilation for Imaging the Small Animal Lung", ILAR J., 2002, vol. 43, pp. 159-174.

Hodge, D., et al., "Dual Cannulation: a Method for Continuous Interveneous Infusion and Repeated Blood Sampling in Unrestrained Mice", Lab Amin. Sci., 1992, vol. 42, pp. 320-322.

Horowitz, P., et al., "The Art of Electronics", 1980, Cambridge University Press, Cambridge, pp. 591-635.

Loughnane, M., et al., "Tethered Infusion and Withdrawal in Laboratory Animals", Animal Lab News, Sep. to Oct. 2004, http://animallab.com/articles.asp?pid=73.

Nagel, S.R., "Lightwave Communication Using Optical Fibers", Fundamentals of Physics, $3^{rd}$ Ed., David Halliday and Robert Resnick, editors, John Wiley & Sons, 1988, pp. E17.1-E17.5.

National Research Council, 1996, Guide for the Care and Use of Laboratory Animals, $7^{th}$ Ed., Washington DC, National Academy Press.

Nolan, T.E., et al., "Methods in Vascular Infusion Biotechnology in Research with Rodents", ILAR J., 2002, vol. 43, No. 3, pp. 175-182.

Patjin, G.A., et al., "Method for Continuous Infusion Into the Portal Vein of Mice", Lab Anim. Sci., 1998, vol. 48, pp. 379-383.

* cited by examiner

HARNESS INTERFACE CONDUIT, TETHER LINE, AND SWIVEL FOR USE IN ANIMALS

FIELD OF THE INVENTION

The invention is directed to devices used to conduct fluids or electrical currents between an animal and external apparatus. In particular, the devices related to systems for fluid infusion or fluid withdrawal from an animal; and/or systems for electrical or optical input and output between an animal and external apparatus.

BACKGROUND OF THE INVENTION

Rodents, specifically rats and mice, comprise more than 80% of the animals used in biomedical research, teaching, and testing. The technology of advanced physiological monitoring in rats, mice and other animals is rapidly advancing. (Goode, R. L. G., Klein, H. J., 2002, Miniaturization: an overview of biotechnologies for monitoring the physiology and pathophysiology or rodent animal models, ILAR J., 43:136-46) Researchers are gathering reliable data from a variety of physiological systems in various rodent species using laser Doppler flowmetry, digital sonomicrometry, bioelectrical impedance, and microdialysis, using noninvasive physiological monitoring methods, in instances where the animal is mobile.

Basic research in fields such as neuroscience, physiology, pharmacology, virology, immunology, and oncology use large numbers of rodents to asses the effects of biological and pharmacologically active agents. (Cunliffe-Beamer, T. L., 1993, Applying principles of aseptic surgery to rodents, AWIC Newslett 4:3-6; National Research Council, 1996, Guide for the care and use of laboratory animals, 7th Ed., Washington D.C., National Academy Press) Many of these studies use vascular infusion technology to derive samples for assessing activity, biodistribution, and plasma duration. A variety of vascular infusion and intravascular delivery systems have been used in rodents for many years (Fox, C. E., Beazley, R. M., 1975, Chronic venous catheterization: a technique for implanting and maintaining venous catheters in rats, J. Surg. Res. 18:607-10).

Physiologic monitoring of animals often requires externalization of percutaneous, subcutaneous, or otherwise indwelling catheters or cannulas which are coupled to tethering tubes which are further coupled to stationary infusion pumps, power consoles or meters. Initially, the mobility of the animals was restricted either physically or chemically to prevent entanglement and disruption of the tethering tubes. To achieve a more normal, stress-free environment, swivels were developed as an intermediate device to couple the tethering tube with the pump. The swivel allowed a singly-housed animal to move freely about the cage. Line tangling was prevented by virtue of the swivels.

For withdrawing fluids from animals, a tethering apparatus is essentially the only option for long-term continuous access to an animal for physiological monitoring. (Loughnane, M., Jacobson, A., 2004, Tethered infusion and withdrawal in laboratory animals, Animal Lab News, September/October) (http://animallab.com/articles.asp?pid=73) Tethering systems allow for mobility of animals that are chronically catheterized. (U.S. Pat. No. 4,900,313) One tethering system that has been described consists of a jacket made of a light weight, breathable nylon netting material, a light-weight, highly flexible stainless steel attaching tether, and a cage-mounted swivel to which the tether is anchored (Chatham, A. K, 1985, Jacket and Swivel Tethering Systems, Lab Animal 14(8): 29-33).

Early pioneers in the area of tethered infusion systems incorporated various "home-brew" systems (Guillery, E. N., Chodak, G. W., 1984, A technique for continuous infusion in the mouse bladder, J. Urol. 131:1005-7; Hagmuller, K., et al., 1992, A tail-artery cannulation method for the study of blood parameters in freely moving rats, J. Pharmacol. Toxicol. Methods, 28: 79-83; Hodge, D, Shalev, M, 1992, Dual cannulation: a method for continuous interveneous infusion and repeated blood sampling in unrestrained mice, Lab Anim. Sci., 42: 320-22; Patijn G. A., et al., 1998, Method for continuous infusion into the portal vein of mice, Lab Anim. Sci., 48:379-83). A key element of any tether system is the swivel that allows for rotational movement of the tethered animal. In the late 1960s, Michael Loughnane, a biomedical engineer at Temple University, began to design and build swivels to meet the needs of research investigators for tethered infusion in rats. His continued efforts in this specialty area led to the commercialization of the swivel and many other well-engineered components and systems for tethered infusion and sampling, which are available from Instech Solomon (Plymouth Meeting, Pa.).

The primary factors for selecting the components of an infusion system include study length, study end point, access site, need for blood withdrawal, and periodic versus continuous access. (Nolan, T. E., Klein, H. J., 2002, Methods in vascular infusion biotechnology in research with rodents, ILAR J., 43(3):175-82.) "Acute" studies can last up to one day in duration, while "chronic" studies can last longer than one day, during which time the animal is maintained in a normal physiological state. The need for chronic access invokes a different set of component requirements compared with an acute study. Tethering of the test animal is used when chronic access to a conduit is required in a freely moving animal.

Tethered infusion, which involves continuous intravenous infusion or fluid withdrawal of small laboratory animals, e.g. rats and mice, are the most common applications of the devices and system of the invention. (FIG. 1) Details of the use of catheters, tether attachment devices, swivels, harnesses and infusion pumps are well known in the art (e.g. Instech Solomon).

Tethered infusion systems typically include a subcutaneous button, jacket or harness, tail cuff, or a head block apparatus placed near the catheter exit site. This restraint part of the system connects to a spring tether, which is attached to a swivel mounted to the animal's cage. Button tethers and head blocks require surgical placement and are used for long-term studies. They are fabricated of stainless steel, plastic, Dacron mesh, or silicone and are surgically implanted directly beneath the skin of the animal. Fixation of head blocks requires the use of dental acrylic, which attaches the device to the skull bones.

A saddle, jacket, harness or a button infusion device permits externalization of a catheter or cannula through the scapular region of the animal. (Loughnane, M., & Jacobson, A., 2004, Tethered infusion and withdrawal in laboratory animals, Animal Lab News) (http://animallab.com/articles.asp?pid=73) Jackets and harnesses require no surgical intervention and are commercially available in a number of materials and sizes (e.g., Lomir Biomedical, Inc., Malone, N.Y.; Kent Scientific Corporation, Litchfield, Conn.; Alice King Chatham Medical Arts, Hawthorne, Calif.). Jackets are reusable and are made of cloth or nylon in a vest-like conformation, with two cutouts for the front limbs and a reinforced area over the catheter exit site that attaches to the spring tether. However, because of their cloth construction, jackets are prone to soiling and must be washed or replaced periodically.

Harnesses have been used more recently as alternatives to jackets. A harness, sometimes referred to as a saddle, covers the externalization site of the catheter, and provides a means of tethering or restraining the animal, so that the conduit does not become disengaged from the animal. A button infusion device is made of polyester mesh, metal or polysulfone plastic and is sutured to the fascia under the animal's skin, allowing conduit externalization through the button's center.

The Covance Harness™ (Covance Laboratories, Vienna, Va.) is constructed of a molded elastomer saddle, with attached silicone bands that form a sling around the animal's body. They are commercially available for both rats and mice, are designed to be disposable, and do not require periodic cleaning (Instech Solomon). They present a much smaller contact area to the rodent's skin and are not as likely to interfere with thermoregulation. The saddle serves as the attachment point for the spring tether and as a protective covering for the catheter, catheter exit site, or external terminus of the animal interface, and subsequent couplings.

Stainless steel tubes are inserted through a hole in the Covance Harness for coupling to a catheter emerging from the animal to the swivel extension line. The coupling of the stainless steel tubes to the catheter and then to swivel extension line and subsequent threading of the line through a tether is slow, difficult and cumbersome to attach. Additionally, no quick removal of the system is available; once the animal is connected to the system it cannot be removed from the swivel extension line and catheter without considerable work. This manipulation results in high stress to the animal, which could lead to erroneous experimental results. Minimizing stress to the animal increases reproducibility from animal to animal, reduces animal use, and is ethically justified for animal welfare and for improving study validity. (Nolan, T. E., Klein, H. J., 2002, Methods in vascular infusion biotechnology in research with rodents, ILAR J., 43(3):175-82 (http:/dels-.nas.edu/ilar/jour_online/43__3/v4303nolan.asp))

The commercially available vascular infusion technology and accompanying product literature provides ample guidance so that a user can select the optimal system or infusion devices such as catheters and pumps to ensure a successful study outcome when vascular delivery or collection of a sample via the vascular route is desirable. The technologies available for monitoring rodent physiological systems and for monitoring and characterizing specific organ systems such as the cardiovascular and respiratory systems are well known, including methods of vascular access in rodents. (Goode, T. L., Klein, H. J., 2002, Miniaturization: An overview of biotechnologies for monitoring the physiology and pathophysiology of rodent animal models, ILAR J., 43:136-46; Hartley, C. J., et. al., 2002, Noninvasive cardiovascular phenotyping in mice, ILAR J., 43:147-58; Hedlund, L. W., Johnson, G. A., 2002, Mechanical ventilation for imaging the small animal lung, ILAR J., 43:159-74; Nolan, T. E., Klein, H. J., 2002, Methods in vascular infusion biotechnology in research with rodents, ILAR J., 43:175-82).

SUMMARY OF THE INVENTION

The invention is directed towards a harness for use in coupling with an animal interface. The harness comprises a conduit with both internal and external terminal fittings, a skirt surrounding the conduit and covering the animal interface. The animal interface can consist of fluid, electrical signals, or optical signals. The invention also contains a swivel extension tether that is able to quickly connect to the harness on one end, and a dual-ended swivel on the other end. The dual-ended swivel further connects to an extension line, which in turn connects to upstream equipment. The invention is also directed towards a method for using the harness in an animal for fluid communication access, an electrical signal interface, and an optical interface.

BRIEF DISCRIPTION OF THE FIGURES

FIG. 1: Schematic of tethered mouse or rat with syringe pump shows pump-tether system.

FIG. 2: Alternate design of harness. 2A: Top view of harness; 2B: lateral plan view of harness; 2C: alternate lateral plan view of harness; 2D: lateral plan view of harness.

Figure 3A:
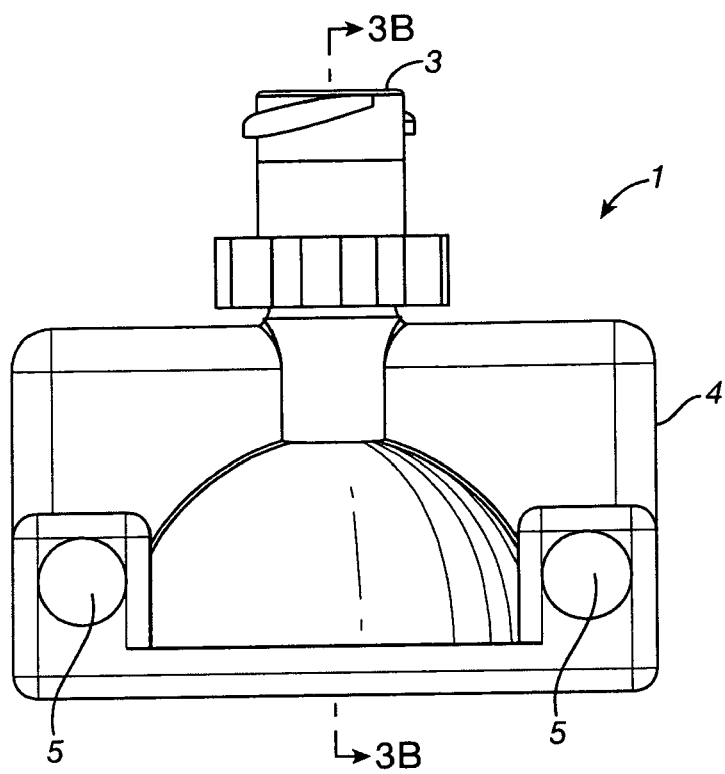
Figure 3B:
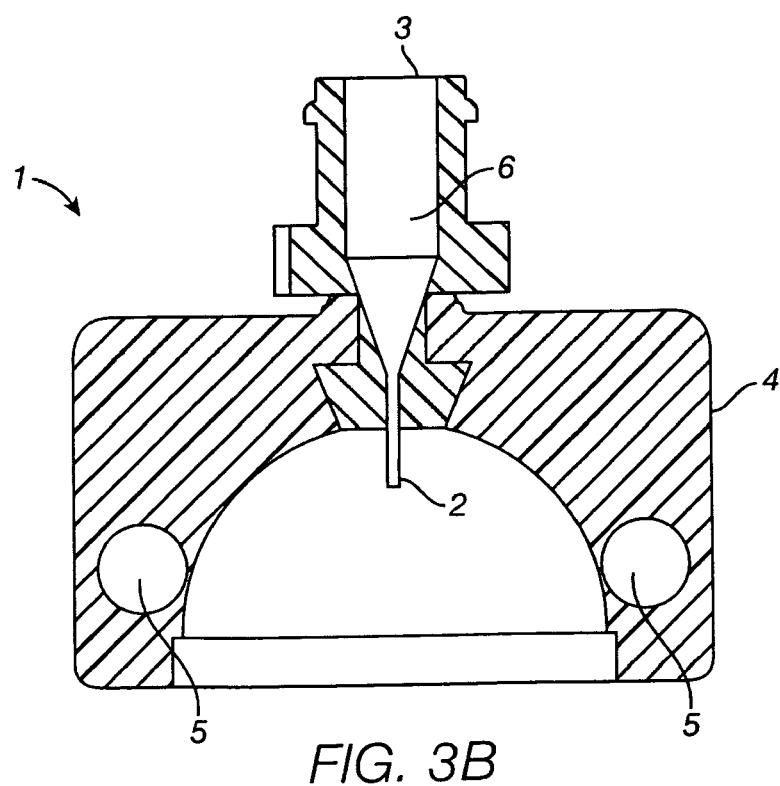

FIG. 3: Harness. 3A: Lateral view of harness; 3B: Lateral cross sectional view of harness.

Figure 4:
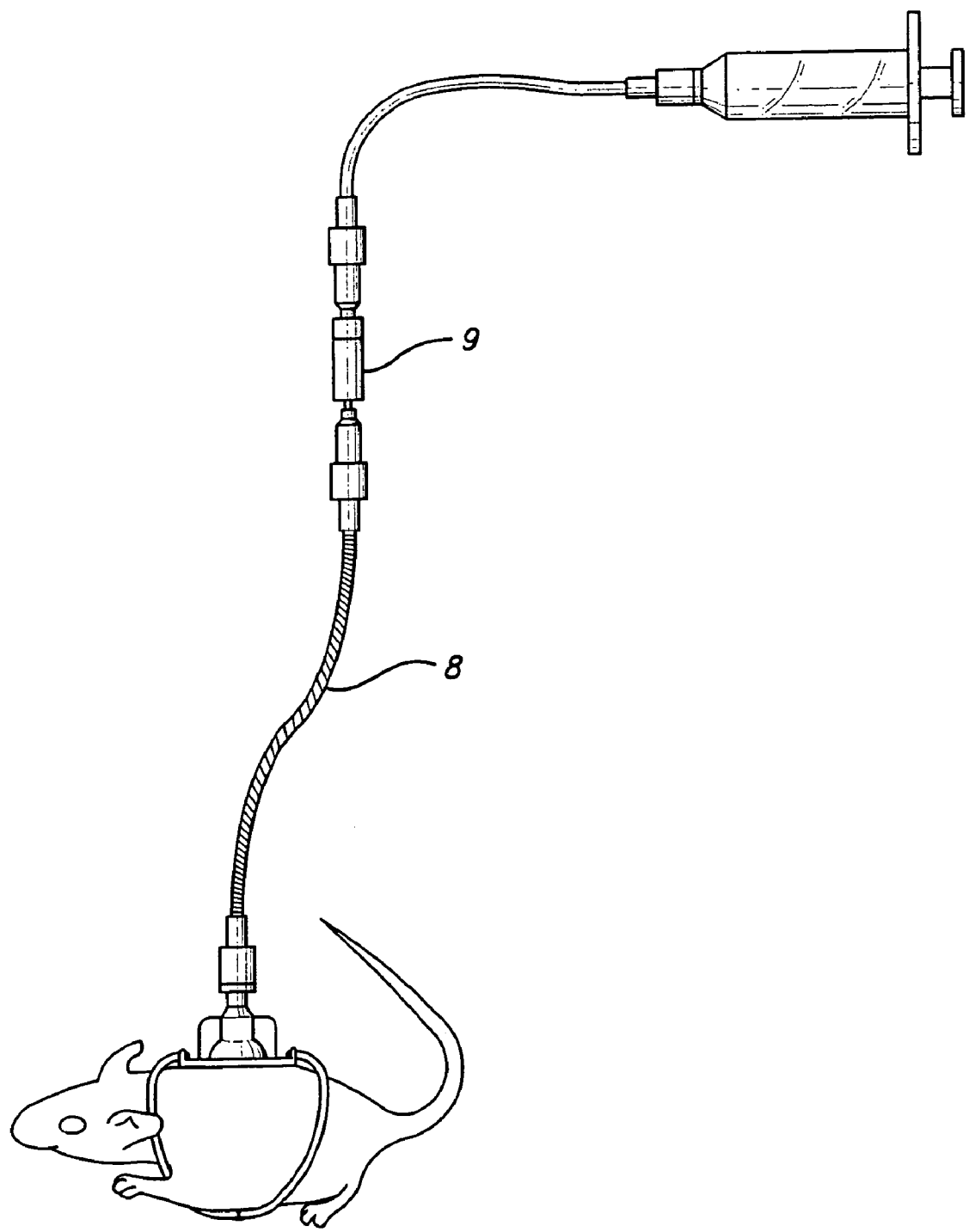

FIG. 4: Animal, harness interface conduit, swivel extension tether, dual ended swivel and syringe.

Figure 5A:
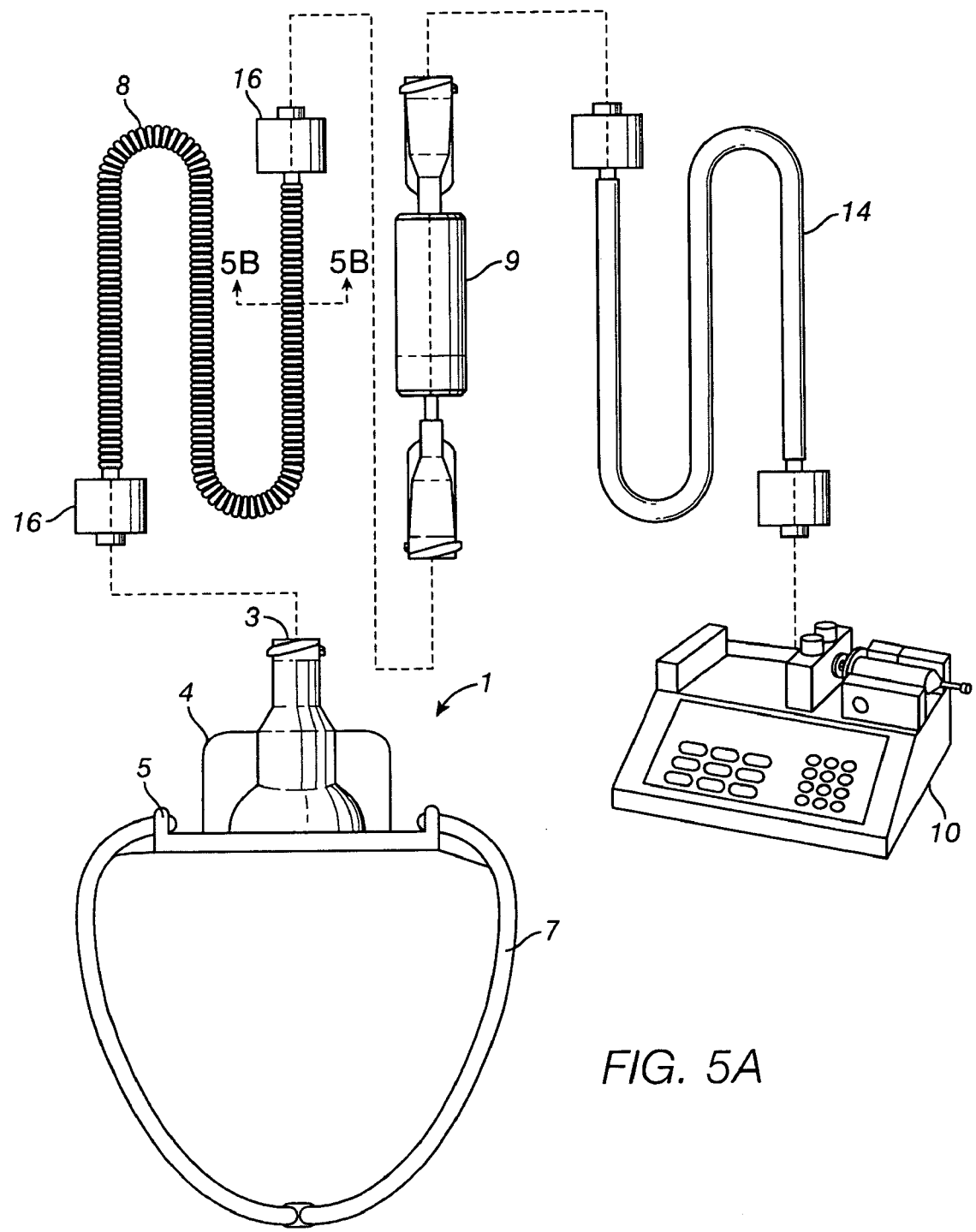

FIG. 5A: Assembly of the harness, tether line, dual-ended swivel, extension line, and upstream equipment; 5B: Cross-section of swivel extension tether from FIG. 5A depicting swivel extension line and external spring tether line.

Figure 6:
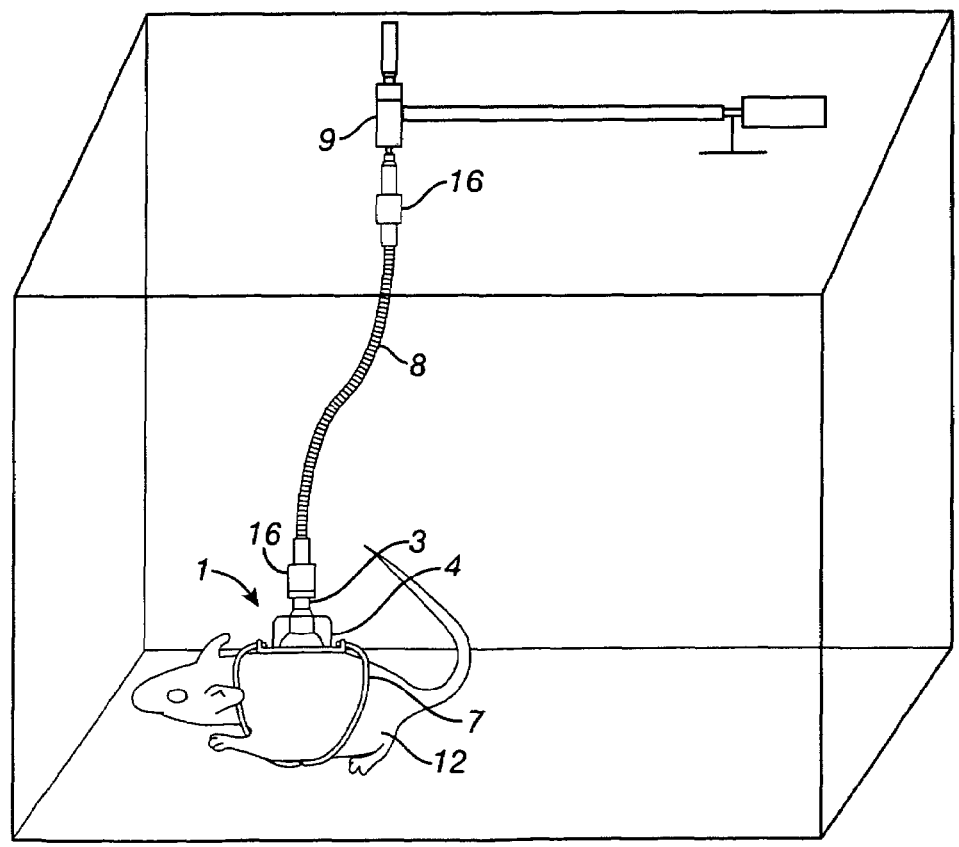

FIG. 6: Animal, harness interface conduit, swivel extension tether, dual-ended swivel and swivel counterbalance arm.

Figure 7:
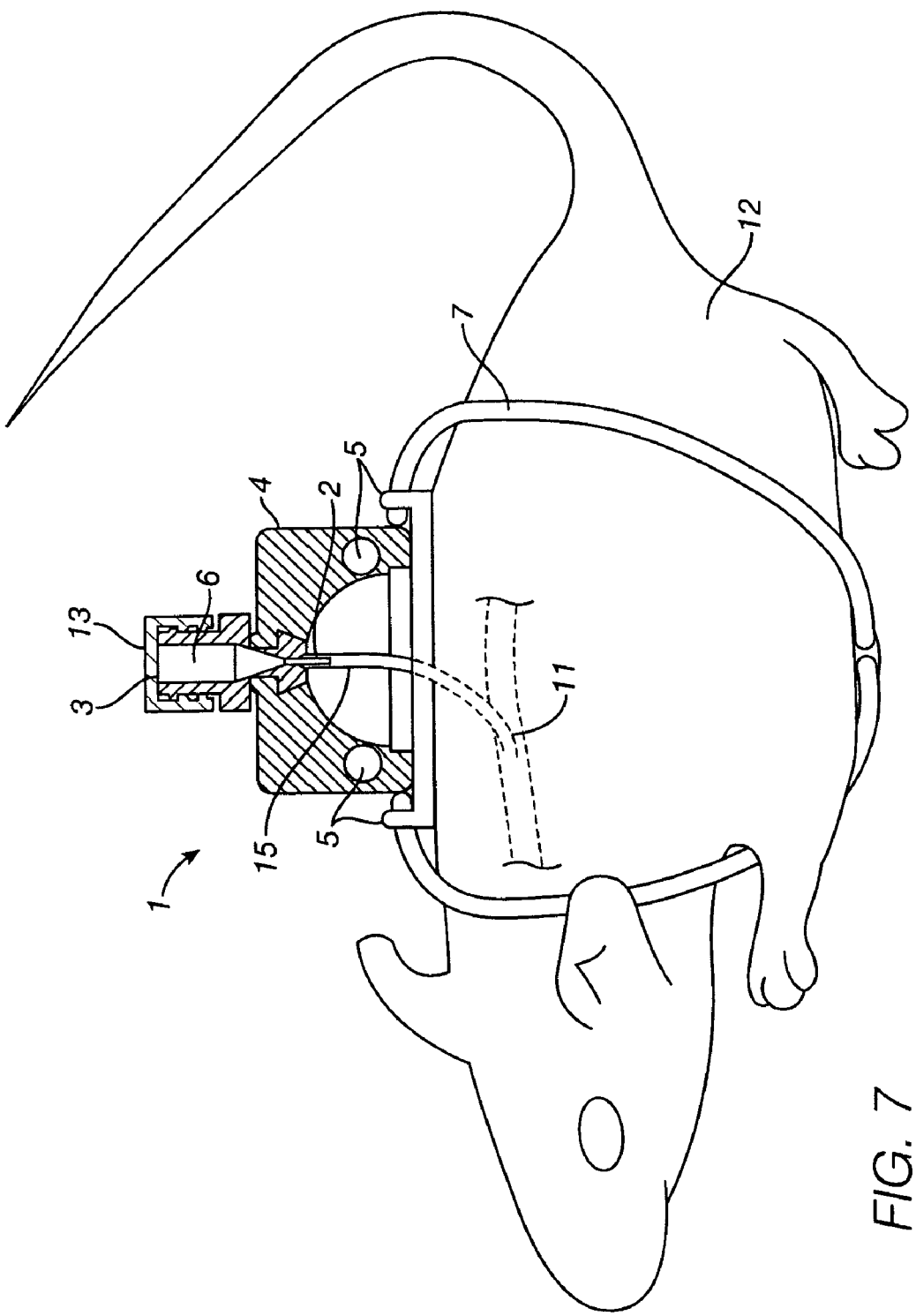

FIG. 7: Connection between the animal interface and the harness, with the external terminal fitting closed off with the external fitting terminus.

DETAILED DESCRIPTION OF THE INVENTION

The invention is directed toward a harness 1 for externalization of an animal interface 15 comprising a conduit 6, a skirt 4, securement devices such as a belly band 7 and a mechanism to adjust the securement device 5. An embodiment of the invention further includes a swivel extension tether 8 and a dual-ended swivel 9. The dual-ended swivel 9 connects to an extension line 14, which connects to upstream equipment 10. Tethered infusion is a commonly used technique in laboratory animals, especially rats, for infusing fluids into or withdrawing fluids from the animal. The tethered system, in addition to comprising an interface for input and withdrawal of fluids, can also be used for electrical and optical input and output.

The harness 1 contains a conduit 6 with an external terminal fitting 3 and internal terminal fitting 2. The internal terminal fitting 2 couples with an external terminus of an animal interface 15. Additionally, the conduit 6 has an external terminal fitting 3 that can be either closed off for use with in intermittent sampling or infusion system, or coupled with a swivel extension tether 8 containing a spring extension line 17 with integral swivel extension line 18. The fitting on the external terminus can be a quick-connect fitting that is adapted for detachable attachment with the swivel extension tether 8. The conduit can be used to convey fluid, electrical, digital and/or optical signals. The harness 1 also contains a skirt 4 that surrounds the circumference of the conduit 6 and axially projects from the conduit 6 to cover the external terminus of the animal interface 15. The skirt 4 is situated between the external terminal fitting 3 and internal terminal fitting 2 of the conduit 6. The skirt 4 can contain an adjustable mechanism 5 to secure and adjust the skirt 4 on the animal.

Definitions

A conduit is a channel or pipe for conveying water or other fluids, or a tube or duct for enclosing electric wires or cables.

(The American Heritage Dictionary, 2nd College Edition, 1976, p. 307) "Conduit" 6 as used herein is a channel, tube, or pipe for conveying fluids; in other contexts, conduit refers to a tube or duct for enclosing electrical connectors or wires, or for enclosing optical fibers. In certain embodiments, a multiplexed conduit comprises a plurality of channels, tubes, ducts, pipes, wires, and fibers suitably insulated from one another. In these instances, it is understood that the conduit communicates with multiple internal termini, as defined below.

The term "catheter" denotes a flexible tubular device to infuse fluids into or collect biological specimens from vessels, hollow organs, or body cavities. A "cannula" is a rigid device placed into tissue, a hollow organ, or body cavity.

"Animal interface(s)" is used herein to mean one or multiple percutaneous, implanted, subcutaneous, intracerebral, intrapartioneal, intracisternal, intrathecal or intravenous conduits, catheters, wires or cannulas for use in infusion and/or withdrawal of fluids, and/or for electrical or optical input and output. The animal interface(s) could be a probe which is/are "indwelling," which is an animal interface situated internal to the animal. Alternatively, the interface may comprise a "dwelling," which is an animal interface dermally situated on the surface of the animal. The portion of the animal interface that is internal (or in contact with the animal in a dwelling system) to the animal is referred to herein as the indwelling segment, which terminates at an "internal terminus or multiple termini of an animal interface" 11, which is positioned in a vessel, organ, body cavity, or on the skin. The portion of the animal interface at which the conduit, catheter, wire or cannula passes through the skin (or is located distally from the skin in a dwelling system) of the animal, ends in the "external terminus of an animal interface" 15

The internal terminus of the animal interface 11 may be comprised of one or many termini. Examples of multi-termini configurations include but are not limited to multiple electrocardiography leads from multiple electrodes; an arterial catheter implanted in a femoral artery for sampling and another catheter in a femoral vein for delivery (a common experimental configuration); a single intrathecal catheter with may holes covering a distance along the catheter and not just the tip; EKG leads transmitting electrical measurements and a blood pressure transducer(s) transmitting blood pressure data from one or many locations; a venous catheter delivering test research substance or article to a vein and EKG leads collecting electrical signals These conduits would all connect to the harness conduit 6 in multiple wire and/or catheter configurations and subsequently to an external source either by direct connection to the harness external terminal fitting 3, an extension line 14 or through a swivel extension tether 8. Accordingly, a multiplexed conduit, in certain embodiments, carries multiple parallel channels communicating with multiple external termini from the animal 15, through the harness 1, and external to the harness, communicating through one or more of swivel extension tether 8, spring extension line 17, swivel extension line 18, single or dual-ended swivels 9, extension line 14 to upstream equipment 10.

The term "skirt" 4 as used herein means a non-surgically installed covering for the external terminus of the animal interface 15.

The term "belly bands" 7 or "securement device" as used herein refers to thin tubing or straps that secure the skirt onto an animal.

"Internal terminal fitting of harness" 2 as used herein provides a communicative (i.e. fluid, electrical, or optical) attachment between the external terminus of the animal interface 15 to the harness 1.

"External terminal fitting of harness" 3 as used herein provides a means of externalization of the conduit 6.

The coupling for connecting two termini is referred to as a "fitting" 16.

"Quick-connect fitting" as used herein is a fitting that can be quickly connected and/or disconnected together with another fitting.

The "tether line" or "spring extension line" 17 as used herein is a leash which connects the swivel to the animal harness, jacket or tailcuff, and which provides a conduit or path through which tubing, wires or other communication conduits may be threaded to establish a connection with the animal interface. This leash provides protection for the internal communication conduit (swivel extension line 18) and transmits the torque of the animal to the swivel.

The term "swivel extension line" 18 as used herein refers to a channel or conduit which provides a communication path for transmission of fluids, electrical current, and/or optical signals between the animal and swivel.

The "external fitting terminus" 13 is used to close off the external terminal fitting of the harness when the swivel extension tether 8 is not connected.

"Swivel extension tether" 8 is herein used to refer to an integrated swivel extension line 18 and spring extension line 17. The swivel extension, in certain embodiments, has one quick connect fitting for connection to the harness 1. In other embodiments, the swivel extension tether has quick connect fittings at its termini which couple directly to the proximal fitting of the swivel and the external terminal fitting of the harness 3, completing a protected communication pathway (FIGS. 5A and B)

"Upstream equipment" 10 refers to a stationary infusion pump, a power console, a meter, or the like.

Animal Interface

Depending on the specific application, the animal interface can be used for the transmission of fluid, electrical signals, digital outputs or optical signals, or combinations thereof to and from the animal. In an embodiment, the system provides an unobtrusive continuous fluid interface, such as a catheter, and can be used to provide, for instance, transmission to the animal of substances such as antibiotics, medication, saline, sustenance, or research articles. Other applications of the system include blood sampling, dialysis, blood pressure monitoring, enteral feeding and bile duct access. A fluid interface can likewise transmit substances from the animal such as blood, lymph, urine, cerebrospinal, gastric, or other biological fluids. The electrical or optical signals can include sensors for electrocardiograph, electroencephalograghy, cardiac output, blood pressure measurements and imaging. The electrical interface can consist of an electrode, and the optical signal source can consist of a transmitter.

A conduit 6 is used to transmit an animal interface. A conduit can be a catheter, an electrical wire, an optic fiber, or a combination thereof. A catheter is used to administer or collect fluids, and is usually a small tube. An electrode is used to administer or record electrical input and output, and an optic fiber is used to transmit optical input and output. In the embodiment of FIG. 7, the internal terminus of the animal interface 11 is inserted into a blood vessel such as the jugular vein or femoral vein and exits in the mid scapular region by methods well know in the art.

Harness

The harness of the invention is a device which provides fluid, electrical, digital or optical communication between the external terminus of the animal interface 15 and the swivel extension tether 8. The harness 1 provides protection and positioning of the external terminus of the animal interface 15 in a desired orientation, while permitting long-term, continuous access to the animal interface through a conduit 6 which contains both an internal terminal fitting 2 and an external terminal fitting 3. (FIGS. 2 and 3) The harness 1 serves to protect both the external terminus of the animal interface 15 as well as the conduit 6 from damage and interference. The harness 1 also provides, with minimal stress, a secure anchor for the animal interface to the animal as well as a means of tethering or restraining the animal. In the current version of the harness or jacket (Lomir and Instech Solomon) the harness or jacket must be sized to match the diameter of the tether. With this system, if the tether size changes so must the harness. In contrast, the harness 1 of the present invention connects to the spring extension tether 8 via a quick connect/disconnect fitting 16, eliminating all sizing issues.

The harness 1 protects the externalization site of the animal interface by way of a skirt 4. In one embodiment, the skirt contains a dome-shaped area molded into the skirt (FIGS. 2 and 3). By securing the coupled external terminus of the animal interface 15 and internal terminal fitting of the harness 2 in the dome-shaped area, it is difficult for the animal to access and manipulate the animal interface. All parts of this connection are protected within the skirt 4 to prevent the animal from manipulating or damaging the interface. The harness 1 can be made of soft elastomeric material, or alternatively can be made of cloth or nylon with two cut-outs for the front limbs of the animal.

The conduit 6 of the invention is suitable for physiological communication between the external terminus of the animal interface 15 and the swivel extension line 8. The conduit 6 can be formed from plastic, metal, composites, or any material which is compatible with the connection to be established. In various embodiments, the conduit 6 may have variable diameters as shown in FIGS. 2 and 3. In various embodiments, the conduit 6 is narrow at the internal terminal fitting of the harness 2 and tapers frustoconical at the external terminal fitting of the harness 3. In certain embodiments of the harness 1, the conduit 6 is molded into the material of the skirt 4; in other embodiments, the harness 1 comprises a conduit 6 which has been inserted through a hole or bore in the skirt 4. In another embodiment of the harness 1, the conduit 6 is molded into a plastic insert which is then molded into the skirt 4. The wings in the plastic insert prevent rotational movement while providing stability within the skirt. In other embodiments the conduit 6 with internal terminal fitting of the harness 2 and external terminal fitting of the harness 3 is sewn, glued, or fastened to a cloth or nylon harness.

Figure 5B:
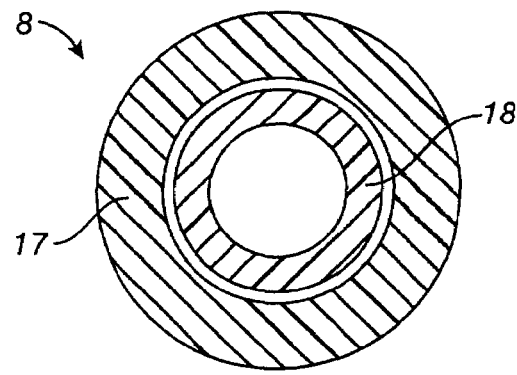

FIGS. 1 and 5 show a diagrammatic view of an embodiment of a conduit 6 that may be used in the devise of the present invention. This embodiment provides upstream equipment 10 for collection or infusion of fluids flowing from the animal interface.

In other embodiments, the conduit 6 is inserted through the skirt 4 of the harness 1. The conduit 6 is anchored into the harness 1. The anchor could be glued, screwed-in, have barbs, or be compression fitted into the harness. In certain embodiments of the harness 1, the conduit 6 is a stainless steel cannula axially situated in the harness. The internal terminus of the steel cannula is shaped for fitting or coupling with the external terminus of the animal interface 15, such as with a blunt shaped end or a barbed end.

The hole or bore in the harness and the circumference of the conduit 6 may be sized for close fitting such that attachment between the harness 1 and the conduit 6 is achieved between friction-generating structures on the outer surface of the conduit 6, including but not limited to barbs, teeth, knurls, or bumps and the wall of the bore or hole in the skirt 4. Additionally, the attachment could be made with "wings" or such to secure a good connection to the harness 1.

The internal terminal fitting of the harness 2 provides a communicative (i.e. fluid, electrical, or optical) attachment between the external terminus of the animal interface 15 and the harness 1. To achieve that, the internal terminal fitting of the harness 2 is affixed to the external terminus of the animal interface 3. To attach the internal terminal fitting of the harness 2 to the animal interface, the internal terminal fitting 2 is aligned and coupled to the external terminus of the animal interface 15, so that the external terminus of the animal interface 15 connects to the conduit 6, providing positioning of the external terminus of the animal interface 15 beneath the skirt 4 of the harness 1. The coupling mechanism chosen should be impervious to fluid flow to prohibit leakage of the solution between the animal interface and the harness conduit. The coupling could be achieved through, for example, a blunt end cannula or a barb fitting. The material of the barb or cannula could be made of plastic, metal, or any other ridged material.

On the external terminal of the harness, there is an external terminal fitting 3 which is connected to the swivel extension tether 8. (FIGS. 4 and 5) The external fitting of the external terminus 3 is shaped for attachment to the swivel extension tether fitting 16. To attach the external terminal fitting of the harness 3 to the swivel extension tether 8, the external terminal fitting of the harness 3 is aligned and coupled to the proximal fitting of the swivel extension tether 8, providing positioning of the harness 1 with the swivel extension tether 8. The external terminal fitting of the harness 3 externally communicates the harness to the swivel extension tether 8. The coupling mechanism chosen should be impervious to fluid flow to prohibit leakage of the solution between the external terminal fitting and the swivel extension tether 8. The external terminal fitting of the harness 3 is shaped as a coupler for gaining access to the swivel extension tether 8. Non-limiting examples of the external fitting include a luer fitting, compression fitting, push-in fitting, barb fitting, or any other modified means of a quick disconnect/connect. Preferably, the external terminal fitting of the harness is a quick-connect and release fitting. Any quick-release mechanism is intended to be within the spirit and scope of the invention.

Preferably, the external fitting connection comprises a female luer connection. A luer connection system is a round male or female interlocking tube, slightly tapered so that the interlocking tube holds together better. (The BME Encyclopedia, http://encyc.bmezine.com/?luer_connector) The luer connection system can consist of a simple pressure/twist fit ("luer slip") or can have an additional outer rim of threading (a "luer lock"). For the luer lock, the rim around the base of the female interlocking tube screws into the rim of the male interlocking tube, thereby locking it in place. The female half of a luer connector can fit onto both a luer slip or luer lock male connector.

In one embodiment, once external terminus of the animal interface 15 is connected to the internal terminal fitting of the harness 2, and the external terminal fitting of the harness 3 can be closed off with an external fitting terminus 13, such as with a standard male luer, cap, two way valve, dead plug, or injection cap if a female luer is used for the external terminus. In another embodiment, the external terminus can be connected to, for example, a male-male swivel extension tether 8 to make a fluid, electrical, or optical path through a female-female modified dual-ended swivel 9 and then ultimately to upstream equipment 10 such as an infusion pump. The current invention makes it easy to remove the animal from the swivel extension tether 8 by simply twisting the luer fitting.

Skirt

The harness 1 comprises a skirt 4 for covering the external terminus of the animal interface 15. As shown in FIGS. 2 and 3, the skirt 4 protects the externalization of the animal interface, the internal terminal fitting of the harness 2, and the connection between the two. The skirt 4 protects the exposed portion of the animal interface by creating a space around the external terminus of the animal interface 15 and the internal terminal fitting of the harness 2. This space is needed to keep the animal from scratching, chewing, or rubbing the animal interface and its external terminus. It also provides a protective area to connect the external terminus of the animal interface 15 to the internal terminal fitting of the harness 2. The skirt 4 also allows for ventilation and access to the external terminal fitting of the harness 3. FIG. 7 illustrates one embodiment of the invention in which the externalization is located dorsally between the shoulders of the animal.

In one embodiment, the skirt 4 is constructed of, for example, a flexible, semi-ridged silicone, molded, elastomeric skirt. In other embodiments, the skirt can be made out of silicone, polyethylene, polyvinylchloride, ABS, PVC, polycarbonate, HDPE, acetyl, Kraton, PeBax, Acrylic, delrin, metal or polyurethane. In other embodiments, the skirt 4 could be made out of nylon or cloth material.

The skirt 4 requires no surgical installation. The skirt 4 secures and protects the harness conduit 6, preventing the conduit 6 from becoming dislodged from the external terminus of the animal interface 15.

Various embodiments of the harness 1 comprise skirts 4 shaped for non-occlusive covering of the animal interface. In one embodiment, the skirt is formed as a vented dome that is situated over the externalization site near the scapular region and is secured to the animal.

Adjustment of the Securement Members

The harness 1 can be secured to the animal by different means, for example, by two adjustable rubber tubes wrapped around the two front limbs, or by adjustable bands wrapped around the belly of the animal. See FIG. 7 in which adjustable rubber or elastomeric tubes, or belly bands 7, are wrapped around the animal's torso, securing the harness 1 to the animal. In practice, the belly band 7 tubing is fed through the adjustable mechanism 5 in the skirt 4. To attach to the animal, the user places the harness 1 with the loose belly bands 7 around the animal by pulling the assembled harness 1 over the animal's head. The front legs fit between the belly bands 7, and the harness 1 should be oriented with the animal's spine as shown in FIG. 7. The ends of the belly bands 7 are pulled simultaneously with pinching the pinch clamps in order to tighten the harness 1 onto the animal. The front legs should fit between the belly bands 7. The belly bands 7 are tightened around animal, leaving just enough slack between the bands and the animal's body so as to not make the bands too tight, lest the animal become constricted or uncomfortable. Conversely, the bands should not be too loose that the harness 1 moves around. The excess tubing is placed in the molded area of the skirt 4 and securely placed out of the way of the animal. The tension of the bands should be checked regularly and adjusted as needed as the animal grows.

Various embodiments of the harness securement are, for example, by a nylon or cloth chest plate or patch worn around the chest of the animal that is secured to the harness by means of adjustable rubber tubes. The cloth chest plate or patch has cutouts for the front legs of the animal and is contoured to fit the ventral side of the animal. The cloth chest plate or patch can be made of materials such as spandex, cotton, lycra, nylon mesh, Hexarmor☐ or Kevlar☐ which is a tear, cut, or bite proof material. The bite or chew resistant material will greatly lengthen the life of the cloth chest plate or patch. The cloth chest plate or patch can be attached to rubber tubes that can in turn attach to the skirt via adjustable clamps. The clamps will allow for easy adjustment of the bands to facilitate a comfortable fit on the animal. Another means of attaching the skirt to the animal is by two adjustable rubber tubes or elastomeric tubes or belly bands 7. These tubes are connected in the middle to allow for an "X" shape. When the front legs are placed on either side of the connector that formed the "X" shape, and the terminal ends are placed through the adjustable clamps on the harness 1 they form a stable yet adjustable attachment for the harness 1 to the animal. In practice, the belly bands 7 tubing is fed thought the adjustable mechanism 5 in the skirt 4.

In certain embodiments, the belly bands 7 are attached to the skirt vis-a-vis a mechanism to adjust securement device 5 such as pinch clamps, mechanical spring clamps, compression fittings, zip tie, cable ties, ball and socket adjustments, jam fittings and any other means of adjusting an elastomeric or tie for the belly bands 7 or cloth jacket. These mechanisms allow for easy adjustments to gain a proper fit to the animal. FIG. 2 shows one embodiment of the pinch clamp. When the pinch clamps are "pinched" the lumen on the clamp enlarges to facilitate easier movement of the bellybands. When the clamps frictionally engage the belly bands 7, the bands don't move. Use of pinch clamps makes adjustments of the belly bands 7 easier. The ease with which the belly bands 7 move through the clamp makes for faster adjustments for attaching the harness on the animal. In one embodiment, two slots, holders, or retention spaces for excess belly band material can be molded onto the skirt. These can hold the extra belly band material away from the animal.

Tethered Systems

Tethered Infusion Systems.

The present invention finds use in intermittent infusion and/or fluid withdrawal. In between intermittent bolus infusions and pure continuous infusions is intermittent infusion, in which continuous infusion is required intermittently for hours or days at a time, e.g. two hours a day for fourteen days. During the infusion period, the internal terminal fitting of the harness 2 of the invention is attached to the external terminus of the animal interface 15, e.g. a subcutaneous venous catheter projecting through the skin. The external terminal fitting of the harness 3 is in turn coupled to the proximal fitting of the swivel extension tether 8. During intervals between periods of infusion, withdraw, or physiologic measurement, the swivel extension tether 8 can be quickly and easily disconnected or reconnected. The benefits are: time savings, reduced animal manipulation time, reduced exposure to potential infection, and reduced animal stress. The harness stays in place, protecting and anchoring the external terminus of the animal interface 15. In another embodiment of the invention, the external fitting terminus 13 can be used to close off the external terminal fitting of the harness 3 when the swivel extension tether 8 is not connected to the harness 1.

Catheters consist of a flexible tubular device to infuse fluids into or collect biological specimens from vessels, hollow organs, or body cavities. A cannula is a rigid device placed into a hollow organ or body cavity. The rigidity of cannulas makes them unsuitable for vessels. However, a catheter allows for multiple improved modifications compared with a cannula. For example, a catheter might be supplied with specific tip geometry, specific predetermined length, and retention beads for stabilization in a vessel. Catheters are available in various composition states referred to as a bio-material, which includes polyvinyl chloride ("PVC," Tygon), polyethylene ("PE"), silicone ("silastic"), polyurethane, polyamide, and PTFE, polyethylethylketone ("PEEK").

The effectiveness of a catheter or cannula is directly linked to its ease of access to the vessel or nonvascular sites to collect blood, lymph, urine, synovial, gastric, intestinal, or cerebral spinal fluids. All target sites have the common catheter requirement for access to infuse or collect fluids. Access to the catheter is obtained by externalizing the catheter vis-à-vis the external terminus of the indwelling animal interface, or by surgically implanting vascular access ports to allow percutaneous catheter access. Externalized catheters have the disadvantage of possible local or systemic infections because they disrupt the epidermal integrity. External catheters may also elicit local inflammatory reactions such as fibrous tracts and granulomas. Elimination of these infections and inflammatory reactions usually involves removal of the catheter and rigorous antimicrobial therapy.

The most common catheter materials for catheter construction and biocompatible use are well known in the art. The reader is directed to Strategic Applications, Inc., Libertyville, Ill., for guidance in construction and use of catheters for animal infusion. (HRC1001 (tapered polyurethane rodent catheter), MJC-01 (polyurethane mouse jugular catheter) MJC-05 (silicone mouse jugular catheter) and access ports by Bard Access systems.)

Tethered electrical conduit. One embodiment of an animal interface consists of an electrical interface. An electrical interface can be used that provides, for instance, electrical signals which emanate from the animal such as electrocardiogram information, bioelectrical impedance, measurement of instantaneous pump flow rate, pump speed, and arterial, central venous and pulmonary artery pressure. (Goode, R. L. G., Klein, H. J., 2002, Miniaturization: an overview of biotechnologies for monitoring the physiology and pathophysiology or rodent animal models, ILAR J., 43:136-46) Likewise, the electrical interface may carry electrical current to and from the animal. Examples of electronic interfaces and conduits used for measurements and signal processing are well known in the art, and have been previously described. (Horowitz, P., and Hill, W., 1980, The art of electronics, Cambridge University Press, Cambridge, p591-635.)

Tethered optical conduit. Alternatively, the animal interface can be an optical fiber which can transmit and receive optical signals such as optical digital signals. An optical interface can be used that provides, for instance, imaging for displaying anatomy, magnetic resonance imaging, Doppler imaging, ultrasound imaging, x-ray angiography, and nuclear angiography (Hartley, C. J., et al., 2002, Noninvasive cardiovascular phenotyping in mice, ILAR J., 43:147-58) An optical system consists of a transmitter (signal source) which encodes information, a transmission medium (signal carrier) such as an optical fiber, and a receiver (signal detector) that decodes or reconstructs the original information. Examples of optical interfaces and conduits are well known in the art, and have been previously described. (Nagel, S. R., Lightwave communication using optical fibers, Fundamentals of Physics, 3rd Ed., David Halliday and Robert Resnick, editors, John Wiley & Sons, 1988, p. E17.1-E17.5)

Swivel Extension Tether

The device of the invention may further comprise a swivel extension tether 8 connected to the external terminus of the harness 3 and the proximal swivel fitting 16. A swivel extension tether integrates a chew-resistant channel with a communication path for transmission of fluids, electrical current, digital or optical signals to and/or from the animal, as well as to act as a leash to transmit torque of the animal to turning to the swivel.

The spring extension line 17 is a means of transmitting rotational torque from the harness to a swivel. The spring extension line provides an inner lumen in the form of a swivel extension line 18 to allow for an internal conduit for communication between the animals interface and the swivel to pass through. The inner lumen of the spring tether can allow for a catheter, electrical wire, or optical signal to communicate to an external source through the swivel. (FIG. 5B) In the present invention, the swivel extension tether 8 integrates the communication conduit in te form of a swivel extension line 18 with the spring extension line 17 and terminal fittings 16. This is an improvement over current systems, because with the current system, the spring extension line and the swivel extension line are separate entities which require separate sizing and connection.

Tethering of the animal is used when chronic access to a biological interface is required in a freely moving animal. The swivel extension line 18 within the swivel extension tether 8 can be made of any flexible tubing, such as polyurethane, silicone, polyethylene, or polyvinylchloride, wire (optical or electrical transmission) or combinations thereof. (Dow Corning, Midland, Mich.; Clay Adams, Parsippany, N.J.) In fluid conductive systems it is advantageous to use the same tubing material as the catheter material to reduce potential compound compatibility issues.

Use of the current system (Instech Solomon or Lomir) involved consideration of the sizes of the spring extension line 17, swivel extension line 18, and the external terminus of the animal interface 15. The spring extension line 17 had to fit the harness 1 as well as a swivel tether fitting 16. The extension line that runs through the spring tether had to be of a size to provide an adequate friction fit between the swivel and the connector between the animal's catheter with the swivel extension line. For example, if the catheter was 23 gauge (G), the tubing connector had to be 22 G, the extension line had to be 23 G and the swivel had to be 22 G. If any one of these components changed, all of the components needed to be re-sized. The present invention requires only one sizing, the connection of the animal interface external terminus and the harnesses' internal terminus fitting 2. In one embodiment, since the external terminal fitting of the harness 3 connecting the swivel extension tether 8 to the harness 1 is the same as the proximal fitting of the swivel, sizing is no longer an issue.

In one embodiment, the swivel extension tether's 8 swivel extension line 18 can be made of flexible tubing, which can in turn be protected with a coiled wire, or a spring tether. Preferably, the swivel extension tether's swivel extension line is sheathed in a spring to provide passage and protection for the swivel extension line tubing and provide for rotational torque from the animal to the swivel. Springs are available in various sizes depending on the number as well as the size of the swivel extension line required to pass through them. (Instech Solomon, Lomir)

Depending on the material to be transmitted from the animal, the swivel extension line 8 can also be an electrical line such as an extender wire or optical fiber. The extender wire is comprised on an electrically conductive material such as metals, oxides, amalgams or flexible and conductive polymers or composite materials. (US Pat App 2004/0006280, hereby incorporated by reference.) The electrically conductive extender wire should have insulating material surrounding the conductive material to protect the electrical signal transmitting through it. The animal interface will connect the electrical extender wire to the harness via an electrical connector which is molded, inserted, or fitted into the harness.

An optical fiber line can also be passed through the spring tether line 8 to transmit optical date from the animal's sensor through an optical swivel (IEC Corporation, Austin Tex.) The animal interface will connect the optical line to the harness via an optical connector which is molded, inserted, or fitted into the harness.

The length of the swivel extension tether 8 can be varied according to the size of the cage and the animal used. The length of the tubing can be from about 4 to 24 inches. For rodents, preferably the length of tubing is 12 to 14 inches (SAI, Instech Solomon, Lomir).

The swivel extension tether 8 has detachable coupling connections or fittings 16, on each end. At one end is the proximal fitting which connects to the external terminal fitting of the harness 3. At the other end, the distal fitting connects the swivel extension tether to the dual or multiended swivel fittings. Preferably, the swivel extension tether coupling contains a quick-connect and release fitting on the proximal end, and a second quick-release fitting on the distal end. The quick-release fitting on the proximal end of the swivel extension tether 8 will correspond and fit with the fitting on the external terminal fitting of the harness 3, while the quick-release fitting on the distal end of the swivel extension tether 8 will correspond and fit the fitting on the dual or multiended swivel 9.

In one embodiment, the swivel extension tether 8 has quick-fitting termini (e.g. male end of a luer lock). One end quickly attaches/detaches from the external terminal fitting of the harness and the other end quickly attaches/detaches to the dual-ended swivel. The outer diameter of the swivel extension tether 8 could be as large as 0.5" or as small as 0.039". The outer diameter of the swivel extension line of the swivel extension tether 8 may be as large as ⅛" to as small as 0.007", depending on the particular quick-connect fitting used. In one embodiment, the outer diameter of the swivel extension tether 8 is 0.131", and the inner diameter is 0.105", and the fluid swivel extension line integrated within the swivel extension tether 8 has an outer diameter of 0.040" and an inner diameter of 0.024".

Dual-ended Swivel

The device of the invention may further comprise a dual-ended swivel 9 connected to the swivel extension tether 8. An embodiment of the present invention incorporates a single-channel dual-ended swivel 9. The dual-ended swivel 9 is a channel that attaches to and connects the swivel extension tether 8 to another extension line 14, which in turn connects to upstream equipment 10 which can be an apparatus such as an infusion pump or meter that is required for the conduct of the animal experiment. (FIGS. 1, 5, and 6) The proximal fitting of the dual-ended swivel 9 connects to the swivel extension tether 8 via a standard male to female luer fitting, while the distal fitting of the dual-ended swivel 9 connects to an apparatus such as a pump or an electrical monitoring device as described in U.S. Pat. No. 5,305,712. Alternatively, the dual-ended swivel 9 can be attached to a syringe, as shown in FIG. 4. The fitting eliminates any diameter sizing of the tubing from the current swivel (Instech Solomon, Lomir) to such apparatus. Current swivels have outlet tubes, which are connected via friction fit with matching sized, inner diameter tubing only. For example, the outer diameter of the outlet tubes on the swivel must be slightly larger than the inner diameter of the connecting tubing. These fittings require special sized tubing to connect the swivel to the stationary equipment and also the external terminus of the animal interface.

The dual-ended swivel 9 permits mobility of a tethered animal, while preventing line tangling or occlusion. Without the swivel, the animal would be significantly encumbered in its movement, and the fluid line could occlude partially or totally. Swivels can be constructed of plastic, Teflon, or stainless steel and are connected to the tether line on one end, and the instrument on the other end, and allows rotational movement of the animal.

Stainless steel swivels can be unlined, or lined with quartz for use with compounds that are incompatible with stainless steel. Stainless steel swivels are designed for long-term repeated use. Plastic disposable swivels are typically less durable and are meant for disposal after a single use. Thus, plastic swivels are useful in preventing cross-contamination between studies and when test articles must be discarded (e.g., in radioisotope studies).

The ends of the swivel can be the same, or they can be different. The ends can be made of luers, as previously described. Preferably, the ends are the same and comprise a female-quick connect luered fitting on each end of the swivel.

In one embodiment of the invention, the use of a single channel dual-ended swivel is contemplated. Single channel swivels are useful in examining the effects of a single compound. Multi-channel swivels offer the ability to infuse multiple compounds to infuse while simultaneously sampling fluid or monitoring multiple physiologic parameters such as blood pressure. Some sample collection studies require dual catheters: one for delivery of the test article and the other for collection of blood. In this system, each catheter is connected to one outlet tube of the multi-channel swivel to allow for separate infusion and sampling. The interface between the swivel tether line and the harness will comprise of a dual or multiple channel fluid quick connect fitting that can be fitted, molded, or compression fitted into the jacket. The ends that connect to the swivel will be separated to fit the corresponding quick connect fitting on the multi-channel swivel. (FIG. 5) The swivels can also be used for electrical or optical fittings as well (Plastics One, IEC Corporation).

Dual channel swivels are also used for automated blood collection systems. Automated blood collection systems have recently become commercially available. The four Systems from Bioanalytical Systems, Inc., Instech Solomon, DiLab, and EiCom, are operated from a computer interface that automatically collects serial samples for up to 24 hours.

Key factors with regard to the selection and use of swivels are rotational friction; seals and leakage; inlet and outlet tube gauge; dead volume; cleanability and sterility; reusable versus disposable characteristic; and mounting hardware. These additional desirable swivel factors have been previously described. (Nolan, T. E., Klein, H. J., 2002, Methods in vascular infusion biotechnology in research with rodents, ILAR J., 43(3):175-82 (http://dels.nas.edu/ilar/jour_online/43_3/v4303nolan.asp)).

In one embodiment of the invention, the dual-ended swivel is a conduit for electrical or digital signals which attaches to and connects the swivel extension tether 8 to upstream equipment 10 or an apparatus such as an amplifier, computer console, power console, or physiological monitoring device that is required for the conduct of the animal experiment. The proximal fitting of the dual-ended swivel 9 connects to the swivel extension tether 8 via an electrical or optical fitting, while the distal fitting of the dual-ended swivel connects to an apparatus such an electrical monitoring device as described in U.S. Pat. No. 5,305,712.

Swivel and Tether Mounting Hardware

The method for attachment of the swivel and spring tether assembly to the animal's primary enclosure depends on the weight of the system relative to the animal's size and the tension that may be transmitted to the assembly by the animal. Attachment methods have been previously described. (Nolan, T. E., & Klein, H. J., 2002, Methods in vascular infusion biotechnology in research with rodents, ILAR J., 43(3): 175-82 (http:/dels.nas.edu/ilar/jour_online/43_3/v4303nolan.asp)). An example of this type of system appears in FIGS. 1 and 4.

Nonswivel Tethering Systems

There are currently two commercial systems available for tethering rodents for fluid and/or electrical signal access that function without the use of swivels (Swivelless Swivel, from Instech Solomon; and the Rat Turn, from Bio Analytical Systems, West Lafayette, Ind.). These systems rely on sensing the animal's movement and responding with either movement of the enclosure or of the tubing/wire conveyance mechanism surrounding the enclosure. The instruments are used primarily for microdialysis studies.

External, Electromechanical Instrumentation

The present invention allows for transmission of fluid, electrical, digital or optical input or output between the animal and devices such as a blood sampler controller and/or an infusion pump. The technology used to monitor physiologic measurements is tailored to the experiment in question, and can be undertaken using a wide variety of instruments, as previously described. Goode, R. L. G., Klein, H. J., 2002, Miniaturization: an overview of biotechnologies for monitoring the physiology and pathophysiology or rodent animal models, ILAR J., 43:136-46)

As soon as an animal is prepared for infusion or sample withdrawal, infusion and withdrawal procedures can be accomplished using manual or automated methods. These methods have been previously described. (Nolan, T. E., Klein, H. J., 2002, Methods in vascular infusion biotechnology in research with rodents, ILAR J., 43(3):175-82 (http:/dels.nas.edu/ilar/jour_online/43_3/v4303nolan.asp); Harvard Apparatus, Holliston, Mass.) For example, syringe pumps are used for tethered infusion, where the pump is stabilized and attached to a tether arrangement. (FIG. 4). With this method, animals can be tethered for long-term infusion for several weeks to months.

Different Animals

The tethered infusion system is for use in animals such as a pets, zoo animals, research animals, farm animals, or exotic animals. In particular, the animals include rodents such as mice and rats, hamsters, ferrets, guinea pigs, rabbits, cats, dogs, swine, and primates.

System Benefits

The ability to infuse compounds into the vascular system and collect blood and other samples from animals is critical to drug research. Rodent models and especially transgenic mouse models have evidenced the need for improved technologies to accomplish this objective. Devices such as the infusion swivel, catheters, implantable pumps, battery operated infusion pumps, and other instrumentation have made notable contributions to biomedical research involving infusion studies. The challenge now facing innovators in this field is to reduce the size of these devices to accommodate the ever-increasing need for studies in transgenic mouse models. Miniaturization is the goal. (Goode, R. L. G., Klein, H. J., 2002, Miniaturization: an overview of biotechnologies for monitoring the physiology and pathophysiology or rodent animal models, ILAR J., 43:136-46) Further advances in these biotechnologies promote scientific advances and accomplish the principles of the 3Rs—especially the ethical criteria of reduction and refinement, which constitute animal welfare.

The system of the invention in various aspects, some or all of which comprise the internal terminal fitting of the harness 2, the external terminal fitting of the harness 3, the conduit 6 between the internal and external fitting, skirt 4, belly bands 7, mechanism to adjust securement device 5, quick connect fittings 16, swivel extension tether 8 and dual-ended or multi-channel swivels 9 with quick connect fittings. The benefits of using the invention include: decrease in time necessary to assemble the complete system as compared to current technology, reduction of animal stress by reducing animal manipulating time, elimination of the need for sizing the swivel extension line to the dual-ended swivel, elimination of the need for sizing the animal catheter to connector, elimination of the need to size the extension line tubing to the swivel, elimination of the need for sizing the extension line from the swivel to the stationary apparatus, elimination of the need for sizing the spring tether and harness fittings, elimination of the need for sizing the spring tether to the swivel connector, easy connect or disconnect the animal from the system for intermittent procedures, reduction of the potential for infection by reducing the time the system is open to the environment during assembly or disconnection, and quick and easy accommodation for bolus injection or withdrawal.

This system, with having a lower handling time of the animal, also reduces stress, and it makes is much easier to remove the animal from the system while maintaining a conduit to the animal. When the animal is removed from the system by simply twisting of the luer fittings, an injection cap or terminal fitting of the quick connect can be placed on the external portion of the interface to close the system. This allows the animal to move freely about its cage while keeping the harness on while maintaining a close interface with the animal. If the animal is to be infused again or have samples withdrawn it can quickly and easily be reconnected to the tether and swivel system. Another large benefit of this system is when the harness is on the animal the quick connect luer fitting can be used as a sampling or injection port. By either removing the male luer cap, using a needle with an injection cap on the external luer fitting, or by a two way valve, a standard syringe can be used to sample or infuse quickly and timely thus reducing stress on the animal, technician and possible reduce the overall cost of the experiment. By reducing contact between the technician and the animal during the sampling process, it is likely that the stress on the animal in reduced. If the animal interface is a catheter it is well established that bacterial transmission down the lumen of the catheter is detrimental to the health of the animal, the patency of the catheter and therefore the quality of the experimental data. By reducing the amount of time and manipulation necessary to connect or reconnect the animal interface ie the catheter interface is open to the laboratory environment for less time, the possibility of bacterial infection is greatly reduced.

1. harness
2. internal terminal fitting of harness
3. external terminal fitting of harness
4. skirt
5. mechanism to adjust securement device
6. conduit
7. belly bands
8. swivel extension tether
9. dual-ended swivel
10. upstream equipment 11. internal terminus of the animal interface
12. rat/mouse
13. external fitting terminus
14. extension line
15. external terminus of animal interface
16. fitting
17. spring extension line
18. swivel extension line

What is claimed is:

1. An interface device for coupling with an animal interface, wherein the animal interface comprises an external terminus that exits or enters the animal at an externalization site, the interface device comprising:
   a. a conduit having an internal end and an external end;
   b. a covering axially projecting from the conduit to cover the external terminus of the animal interface and the externalization site of the animal, wherein the conduit is permanently affixed to and passes through to an underside of the covering;
   c. an internal terminal fitting attached to the internal end of the conduit and adapted to provide communicative attachment of the internal end of the conduit to the external terminus of the animal interface;
   d. an external terminal fitting attached to the external end of the conduit and adapted to provide communicative attachment of the external end of the conduit to the external environment; and
   e. a securement device attached to the covering for securing the covering to the animal.

2. The interface device of claim 1, further comprising a swivel-extension tether having a proximal end and a distal end, wherein the proximal end is removably attachable to the external terminal fitting.

3. The interface device of claim 2, further comprising a dual-ended swivel at the distal end of the swivel extension tether.

4. The interface device of claim 2, further comprising a quick-connect fitting at the proximal end of the swivel extension tether and a second quick-connect fitting at the distal end of the swivel extension tether.

5. The interface device of claim 1, wherein the securement device is selected from the group consisting of: a belly band, a jacket, and a vest.

6. The interface device of claim 5, further comprising means for adjusting the securement device.

7. The interface device of claim 1, wherein the covering is a skirt.

8. The interface device of claim 7, wherein the skin is symmetrical about an axis, and wherein the conduit is substantially coaxial with the axis.

9. The interface device of claim 8, wherein the skin has a bottom surface defining a plane, and wherein the axis is perpendicular to the plane.

10. The interface device of claim 7, wherein the skirt further comprises a dome-shaped area.

11. The interface device of claim 7, wherein the skirt further comprises a vented dome.

12. The interface device of claim 1, further comprising a plurality of internal termini adapted to provide communicative attachment of the animal interface to a plurality of internal ends of a multiplex conduit.

13. The interface device of claim 1, further comprising a plurality of external termini adapted to provide communicative attachment of the animal interface to a plurality of external ends of a multiplex conduit.

14. The interface device of claim 1, wherein the conduit is adapted for fluid communication.

15. The interface device of claim 1, wherein the animal interface is selected from the group consisting of a percutaneous dwelling, an implanted dwelling, a subcutaneous dwelling, an intracerebral dwelling, an intraperitoneal dwelling, an intracisternal dwelling, an intrathecal dwelling, and an intravascular dwelling.

16. The interface device of claim 1, wherein the conduit conveys fluid, electrical signals, or optical signals to the animal interface.

17. The interface device of claim 1, wherein the animal interface is a catheter.

18. The interface device of claim 1, wherein the external terminal fitting is a quick-connect fitting.

* * * * *